May 20, 1952  C. J. HOPKINS  2,597,584
MOTOR VEHICLE PASSING SIGNAL
Filed Jan. 22, 1951
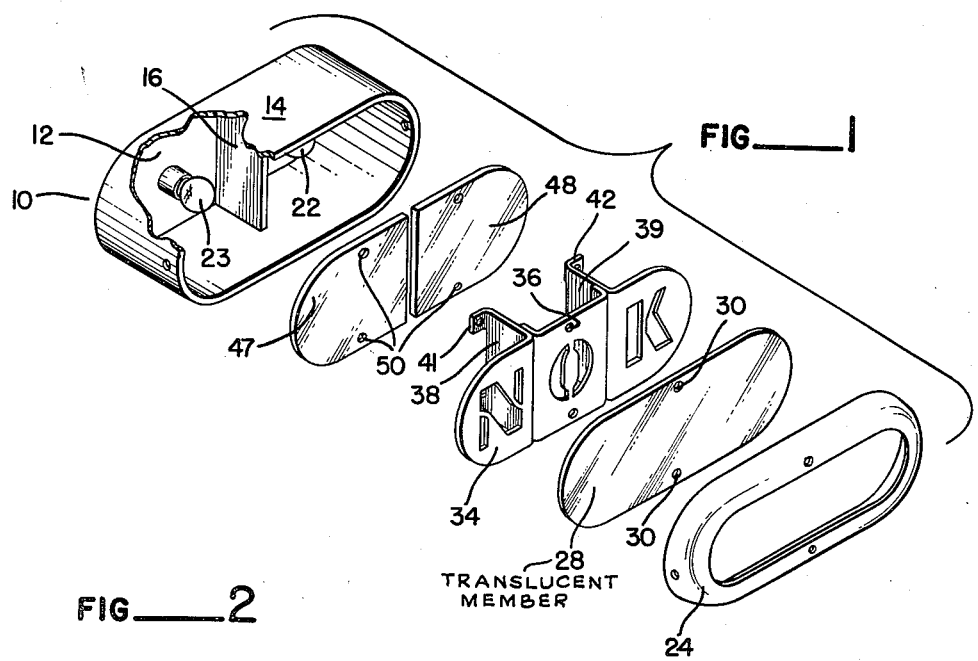
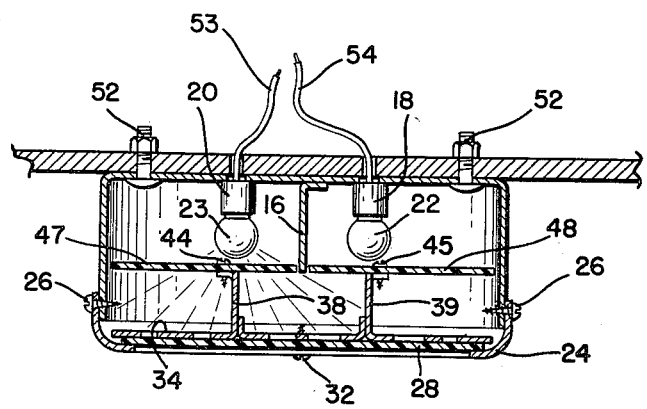
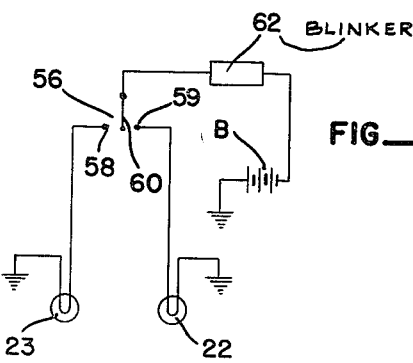
CELESTIN J. HOPKINS
Inventor
By Smith & Tuck
Attorneys Patented May 20, 1952

2,597,584

UNITED STATES PATENT OFFICE 2,597,584

MOTOR VEHICLE PASSING SIGNAL

Celestin J. Hopkins, Port Angeles, Wash.

Application January 22, 1951, Serial No. 207,217

4 Claims. (Cl. 177—329)

This present invention relates particularly to signaling devices for automotive vehicles, and more particularly, to a simple, compact light arranged so that two colorless bulbs are sufficient to give two distinctive word signals each in an appropriate color.

The large bodies used on highway trucks today greatly complicate the passing problem for the driver of an overtaking car. This is particularly true in the mountainous areas and especially where highways are curved. Under such conditions visibility is often completely obscured by the leading truck yet the driver of the truck, because of his relatively high position, and the fact that he is the leading vehicle, has excellent observation of the road ahead. Now truck drivers as a rule have had a very enviable record for safe driving and they are as a whole very alert to prevent accidents which might involve their own vehicle. It therefore has become increasingly more common for truck drivers to attempt to convey interpretable signals by blinking their lights or otherwise so that an overtaking vehicle driver will understand that it is safe to pass, or by not so doing, indicating that it is not safe to pass.

It becomes apparent that there is a real need for an unmistakable signaling device that will command the attention of the overtaking car driver and definitely convey a message to him. Numerous attempts have been made in the past to supply equipment for this purpose. However those observed have been characterized by their bulk which makes it difficult to install them in an optimum position on a vehicle and the complexity of the same involving usually a large number of light bulbs has been such that to date such devices have not met with general acceptance. It is to overcome the deficiencies of the signaling devices noted in the past that I have provided my simplified signaling arrangement.

The principal object of my present invention therefore is to provide an electrically energized signaling device which is characterized by a very compact structure that can be built economically and which will require a very minimum of servicing throughout its useful life.

A further object of my present invention is to provide an electric signal light which will provide a clear word indication that it is safe to pass or a word indication that it is unsafe to pass.

A further object of my invention is to provide an electric signaling device in which the signal for safe passage is illuminated by a recognized safe color as green and the word indicating it unsafe to pass is illuminated by red as a further cautionary measure.

A further object of my present invention is to provide an electrically lighted signaling device in which the word signal displayed is illuminated by a pulsating or intermittent current so that a flashing of the signal is provided which in turn assures the greatest possible certainty of it being observed by a following car.

Further objects, advantages and capabilities will be apparent from the description and disclosure in the drawings, or may be comprehended or are inherent in the device.

In the drawings:

Figure 1 is a bracketed, exploded view in perspective showing the various elements making up my signaling device, certain parts being broken away and shown in section;

Figure 2 is a horizontal sectional view taken through the longitudinal axis of my signal lamp;

Figure 3 is a diagrammatic wiring diagram of the electric circuit used with my signaling device.

Referring more particularly to the disclosure in the drawings, the numeral 10 generally designates the main housing of my signaling device. This I prefer to form as a single drawn unit having the base portion 12 and an outstanding wall portion 14 shaped generally oblong with the major axis in horizontal plane. At each end a pronounced curve is preferred to the end that the device will be easily installed and have the minimum tendency to entangle or to provide a lodgment for foreign materials. The housing may be made of any suitable material and has one basic requirement that it be opaque. Vertically disposed within housing 10 is a fixed baffle 16 subdividing the closed back wall 12 of the housing into two equal parts. This baffle may be welded to the housing if it is formed of steel or brazed or cemented thereto if from other materials. If the housing is molded the baffle would preferably be formed as a unit with the housing.

Disposed equidistant from baffle 16 are electric light sockets 18 and 20 each adapted to receive a colorless light globe 22 or 23. To insure proper functioning of my signaling device, baffle 16 should extend outwardly from face 12 further than the outermost part of light globes 22 and 23 for reasons which will be explained under the operation of this device.

Adapted to form an enclosing cover for housing 10 is the bezel member 24. This member should also be of opaque material preferably of the same material as the housing and be secured thereto after the showing of Figure 2 by a plurality of screws 26. Adapted to be secured in place by member 24 is a translucent diffusing plate 28. This plate may be preferably pierced with openings 30 so that it may be held in position by a plurality of screws 32. Disposed preferably in plane engagement with plate 28 is a mask member 34 and to this end the center portion of mask 34 is pierced with holes 36 adapted to engage the threaded portions of screws 32. In this manner the bezel 24, the diffusing plate 28 and mask 34 are held together as a unit and may be removed as a unit from the signaling device by the removal of screws 26. A preferred construction of mask 34 is illustrated in Figures 1 and 2 in which the mask consists essentially of three portions which are welded or otherwise secured in fixed relationship, each of the portions having a vertical plane surface which lies in a common plane and each of which is pierced to form a letter. In the preferred form, the letters are "NOK," the "O" being used in combination with the "N" to produce the word "NO" or in combination with the letter "K" to produce the colloquialism "OK." In order to form an effective mask and form the letters when light is passed therethrough, the mask must of necessity be made of opaque material. The same also is true of the two inwardly directed walls or baffles 38 and 39, secured to the mask, which terminate in outwardly directed lugs 41 and 42 disposed one on each margin of each baffle. These lugs are pierced to accept the threaded portions of screws 44 and 45.

Secured to lugs 41 and 42 by means of two each of screws 44 and 45 are the substantially transparent filters 47 and 48. These filters are pierced with holes 50 to receive screws 44 and 45 and when so seated on two lugs 41 and two lugs 42 the filters should lie in a plane parallel to the plane of the front surface of the mask. Following the showing of parts of Figures 1 and 2, filter 47 which will control the color of the light passing through the letter "N" of the mask and selectively through the "O" should preferably be red as it indicates a warning. Filter 48 on the other hand should preferably be green or any other color which may be accepted as indicating safe passage. This filter controls the light passing through the letter "K" and selectively through the letter "O." In order to obtain the desirable functioning of my device filters 47 and 48 should be spaced apart in their final mounting so that they will lie upon each side of baffle 16 after the showing of Figure 2.

Some suitable means for mounting my signaling device should be provided, as for instance the bolts 52, and means should be provided for leading out the current supplying wires 53 and 54 with means further provided for the connecting of the current return line to the chassis ground of the vehicle. If that is not convenient then a third wire, which can be led to a ground or to the battery, will of necessity have to be used.

Method of operation

In using my signaling device the same is assembled in position with the electrical connections in keeping with Figure 3 completed. With this arrangement, the source of current supply is normally battery B of the truck, and the current in passing from the battery to the three-way switch 56, passes through a heat-responsive device 62 commonly referred to as a blinker which will cause a pulsation of the current when the circuit is completed so that the light emitted by globes 22 or 23 will be pulsating or flashing. These blinker devices are well known on the market and any one of several types manufactured will be suitable if it is adapted to the voltage of battery B. Switch 56 should be of the general type quite commonly used for direction signaling on cars and consists of the spaced contact points 58 and 59 with a switch arm 60, formed as a lever, that may be operated by the hand to selectively contact either post 58 or 59. Such switches as are now in common use are spring urged into the open position; and, while this arrangement is not mandatory, it is the most satisfactory way of only giving signals when desired and never giving a false signal. If switch arm 60 contacts post 58 light 23 will be illuminated. This will cause the illumination of the letters "N" and "O" and the light passing through the mask 34 will be colored by filter 47 in this case preferably red. At the same time baffle 16 and baffle 39 prevent any of the light illuminating the letter "K." This arrangement is indicated to a degree by the dashed rays radiating out from globe 23 as shown in Figure 2 of the drawings. On the other hand, if lever 60 is moved so that contact is made with switch point 59, light globe 22 will be energized and light will pass through preferably a green filter 48 then out through the mask portion having the letters "O" and "K." Extraneous light will be prevented from reaching the mask letter "N" by the central baffle 16 and the second baffle 38. Attention is directed to the fact that first baffle 38 and second baffle 39 should preferably be disposed in the same plane as the filaments of light bulbs 23 and 22 respectively, after the showing of Figure 2, so that there will be a minimum masking of light by the baffles.

Now in use, with this device applied to the rear end of a truck for instance, the driver of the truck instead of having to rely upon makeshift signaling that may be misunderstood can now definitely illuminate either the "NO" or the "OK" at will. Then to further insure that the automobile driver will understand that the signal is meant for him, the signal will normally be applied only when the truck driver, through the rear view mirrors, becomes aware of the fact that there is a car behind him. Then to distinguish this signaling device's illumination from the lights which are so generously applied to the back end of the trucks, mainly the marginal, outlining and clearance lights, the current passing through the blinker device 62 will draw attention to it and cause it to stand out from the other lights, and thus avoid confusion. As soon as the overtaking car has started to pass the truck, the truck driver can release switch lever 60 which would then be automatically returned to the open position and the signal would no longer be operative as it will have served its purpose.

Throughout this specification this device has been described as associated with an automobile or truck, however, this is to be understood as only an exemplary showing of a preferred embodiment of the invention; the invention is useful in many other fields and various changes may be desirable in the structure used to meet the conditions encountered.

Having thus disclosed the invention, I claim:

1. A traffic signaling device to be secured at the rear of a vehicle, comprising: a housing having a flat base portion and a wall portion outstanding from said base portion, said wall portion having an oblong outline with rounded ends in cross-section taken in a plane parallel to said base; a central baffle extending from said base and dividing said wall portion into two compartments disposed side by side; a first colorless light bulb centrally positioned in one of said compartments and a second colorless light bulb centrally positioned in the other of said compartments; a bezel member positioned on the outer end of said wall portion and secured thereto, said bezel member having an oblong opening therein with each end portion disposed above one of said compartments; a stencil member positioned inside of said bezel member having openings therein forming the letters "N" and "K" at either end, each aligned with one of said compartments, and the letter "O" disposed in between; a translucent diffusing plate positioned between said bezel member and said stencil member; said bezel member, stencil member and diffusing plate being secured together; a first baffle secured to said stencil member between said "N" and said "O" and extending toward said first light bulb and a second baffle secured to said stencil member between said "K" and said "O" and extending toward said second light bulb; a filter member secured to said first baffle and disposed parallel to said stencil member and colored red; and a filter member secured to said second baffle and disposed parallel to said stencil member and colored green; said first, second and central baffles and said filters being disposed so that light passing from said first bulb illuminates only said letters "N" and "O" and is colored red and so that light passing from said second bulb illuminates only said letters "O" and "K" and is colored green.

2. A traffic signaling device, comprising: a housing having a base portion and a wall portion outstanding from said base portion; a central baffle extending from said base and dividing said wall portion into two compartments disposed side by side; a first colorless light bulb positioned in one of said compartments and a second colorless light bulb positioned in the other of said compartments; a stencil member positioned at the outer end of said wall portion having openings therein forming the letters "N" and "K" at either end, each aligned with one of said compartments, and the letter "O" disposed in between; a first baffle member positioned in said housing and extending from said stencil member between said "N" and said "O" toward said first light bulb, and a second baffle member positioned in said housing and extending from said stencil member between said "K" and said "O" toward said second light bulb; a filter member disposed between the end of said first baffle member and said first light bulb and colored red; and a filter member disposed between the end of said second baffle member and said second light bulb and colored green; said first, second and central baffles and said filters being disposed so that light passing from said first bulb illuminates only said letters "N" and "O" and is colored red and so that light passing from said second bulb illuminates only said letters "O" and "K" and is colored green.

3. A traffic signaling device, comprising: an oblong housing having a flat base portion and a wall portion outstanding from said base portion; a first light bulb and a second light bulb operatively positioned in spaced relationship in said housing and disposed on the longitudinal axis of the same; a central opaque baffle secured to said base, between said light globes, on the transverse axis of said housing, dividing the housing into two equal compartments, and extending outwardly from said base just beyond the outer extent of said light globes; a stencil member positioned at the outer end of said wall portion having openings therein forming the letters "N" and "K" at either end and the letter "O" disposed in between; a first baffle member positioned in said housing and extending from said stencil member between said "N" and said "O" toward said first light bulb and substantially on the longitudinal axis of said light bulb, and a second baffle member positioned in said housing and extending from said stencil member, between said "K" and said "O," toward said second light bulb and substantially on the longitudinal axis of said second light bulb; means for coloring the light output of said first light bulb a color used to indicate danger; means for coloring the light output of said second light bulb a color used to indicate safety; said first, second and central baffles and said means for coloring the light output being disposed so that light passing from said first bulb illuminates only the letters "N" and "O" and is colored a color indicating danger and so that light passing from said second bulb illuminates only said letters "O" and "K" and is colored a color indicating safety.

4. A traffic signaling device, comprising: a housing having a base portion and a wall portion outstanding from said base portion; a central baffle extending from said base and dividing said wall portion into two compartments disposed side by side; a first light bulb positioned in one of said compartments and a second light bulb positioned in the other of said compartments; a letter forming member positioned at the outer end of said wall portion and having a first portion opposite said first bulb, a second portion opposite said second bulb, and a third portion opposite said central baffle, said letter forming member having light obstructing means forming, when light passes through said first, second and third portions, the letter "N" in said first portion, the letter "K" in said second portion, and the letter "O" in said third portion; a first baffle member positioned in said housing and extending from said lettered member between said first portion and said third portion toward said base portion, and a second baffle member positioned in said housing and extending from said lettered member between said second portion and said third portion toward said base portion; said first, second and central baffles being disposed so that light passing from said first bulb illuminates only said first and said third portions and so that light passing from said second bulb illuminates only said second and said third portions.

CELESTIN J. HOPKINS.

REFERENCES CITED

The following references are of record in the file of this patent:

UNITED STATES PATENTS

| Number | Name | Date |
| --- | --- | --- |
| 2,044,300 | Heans | June 16, 1936 |
| 2,464,535 | Smith, Jr. | Mar. 15, 1949 |
| 2,483,687 | Wisuri | Oct. 4, 1949 |